United States Patent [19]

May

[11] Patent Number: 4,535,397
[45] Date of Patent: Aug. 13, 1985

[54] PORTABLE SPOTLIGHT

[75] Inventor: Richard L. May, Manhattan Beach, Calif.

[73] Assignee: Mr. Gasket Company, Cleveland, Ohio

[21] Appl. No.: 558,318

[22] Filed: Dec. 5, 1983

[51] Int. Cl.³ .............................................. B60Q 1/00
[52] U.S. Cl. .................... 362/369; 362/109; 362/183; 362/205; 362/206; 362/208; 362/295; 362/376; 362/390; 362/396; 362/399; 362/306; 362/310; 200/60
[58] Field of Search ............... 362/372, 362, 267, 390, 362/399, 183, 376, 208, 109, 205, 206, 295, 396, 306, 310, 369; 200/60

[56] References Cited
U.S. PATENT DOCUMENTS 2,138,076  11/1938  Taylor et al. ................... 362/372
2,491,170  12/1949  Ellis ................................ 362/362
2,719,217   9/1955  Lemons .......................... 362/372
4,233,655  11/1980  Zelina, Jr. et al. ............ 362/390 X Primary Examiner—Stephen J. Lechert, Jr.
Attorney, Agent, or Firm—Roylance, Abrams, Berdo & Goodman

[57]  ABSTRACT

A spotlight assembly conformed for electrical excitation through the cigarette lighter of an automobile comprises a hollow housing formed by mating a front and a rear housing halves, each half including an upper portion for receiving a bulb and a lower portion forming a handle. The bulb, preferably of the sealed beam type, is retained against outward progression by an inwardly directed lip in the upper front portion and is pressed against this lip by an annular ring in the rear upper portion, the ring being guided by axially aligned posts for compression against the bulb by helical springs on each post.

3 Claims, 6 Drawing Figures

PORTABLE SPOTLIGHT

BACKGROUND OF THE INVENTION

1. Field of the Invention

The present invention relates to portable spotlights and more particularly to handheld spotlight assemblies conformed for electrical excitation from an automotive electrical circuit.

2. Description of the Prior Art

Spotlights of various configurations, beam shape and power have been known in the past. In the recent past various handheld spotlights conformed for use by the driver of an automobile have acquired public acceptance, particularly for the convenience such spotlights provide in emergency situations. Being primarily functional only in such emergencies this last group of spotlights justifies only limited production cost while demanding ruggedness to survive long periods of inattention and maintenance convenience. These constraints are best achieved by simple assemblies judiciously designed for optimum function.

In the interest of the foregoing functional simplicity the use of sealed beam lamps of the type found in the automobile has been favored and the hand-held spotlight must, therefore, conveniently accept the installation thereof. Moreover, once installed, protection of the sealed beam lamp against shock and impact becomes a significant consideration in the structure of the spotlight.

SUMMARY OF THE INVENTION

Accordingly, it is the general purpose and object of the present invention to provide a spotlight assembly formed to receive automotive sealed beam lamps of various thicknesses.

Other objects of the invention are to provide a spotlight assembly which conveniently opens for replacement of the bulb.

Yet further objects of the invention are to provide a spotlight assembly having structural features conformed to protect the bulb and to attenuate shock.

Briefly, these and other objects are accomplished within the present invention by providing a spotlight assembly housed in a hollow housing at two mating sections, the first or the forward section being provided with an interior lip against which the edge of the sealed beam lamp may be pressed. The second or the rear half of the housing is formed as a cavity receiving the rear portion of the lamp including a plurality of axially aligned posts onto which an annular ring is mounted. Compressed between the angular ring and the opposing surface of the rear housing are a plurality of springs each placed on corresponding posts and each urging the annular ring against the rear side of the lamp. Both the forward and rear sections of the housing furthermore include a transverse projection which cooperatively form a handle from which a cord extends. Formed adjacent the rear spine of the handle, in the manner of a semi-circular depression, is a switch cavity in which a switch is placed for manipulation by the user. The upper edge of the front and rear sections of the spotlight housing may be provided with an overlapping toothlike engagement and thus the only fastening that is required is the fastening across the separate halves of the handle.

The provision for rearward translation of the annular ring on the posts accommodates lamps of various thicknesses while at the same time providing the necessary displacement against springs to cushion impact and shock. In this form, both housing halves can be made of a plastic material structure, conveniently cast to the desired shape and conveniently assembled. These aspects reduce the cost of the assembly while at the same time providing for the necessary structural protection of the lamp.

DESCRIPTION OF THE PREFERRED EMBODIMENT

Figure 1:
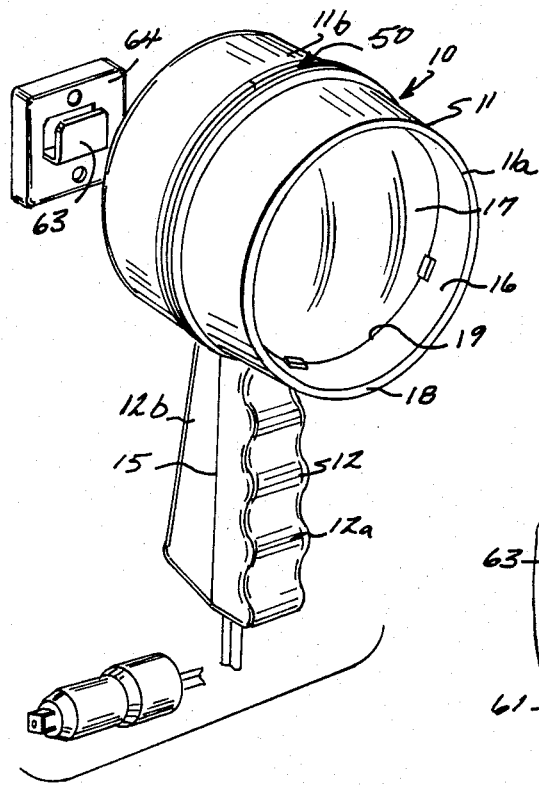
FIG. 1 is a perspective illustration of an inventive spotlight assembly including features for the suspension thereof.
Figure 2:
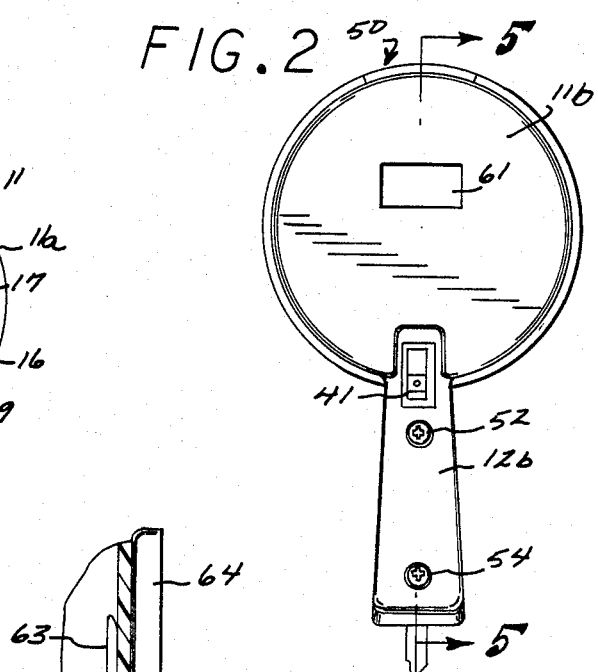
FIG. 2 is a rear view of the spotlight assembly shown in FIG. 1.
Figure 5:
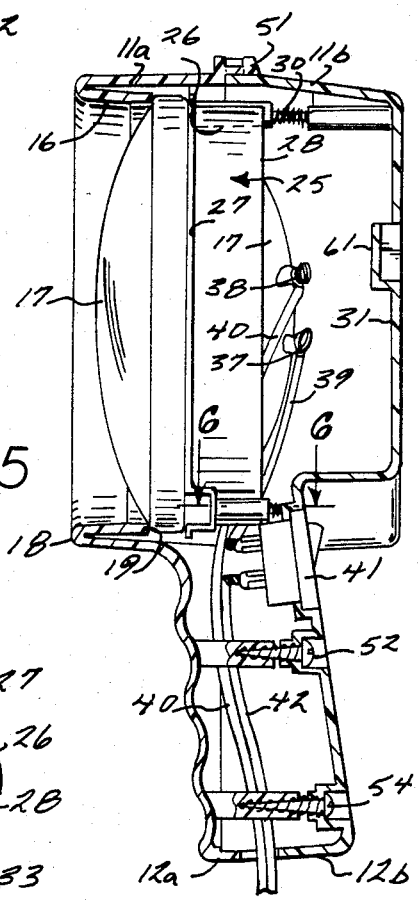
FIG. 5 is a side view, in section, taken along line 5—5 of FIG. 2.

As shown in FIG. 1 the inventive spotlight assembly generally designated by the numeral 10, is characterized by an upper cylindrical housing 11 attached to a radially projecting handle 12. Both the housing 11 and the handle 12 are formed by way of mating front and rear hollow sections, respectively designated by the suffix (a) and (b), joined across a parting line 15. The forward end of housing 11, i.e. the front of housing section 11a, defines a central opening 16 in which the lens of a sealed beam lamp assembly 17 is exposed. To protect this lens from incidents of impact and damage, opening 16 is surrounded by a projecting peripheral edge 18 tapering along a conical surface towards the interior of the housing to form a lip 19 shown in more detail in FIGS. 1 and 5. This lip 19 defines a circular opening just smaller than the radial dimension of the lens of bulb 17 thus retaining the lens against outward translation. In a similar manner an annular ring 25 is pressed against the opposing peripheral surface of the lamp 17 within the confines of the housing 11.

Figure 6:
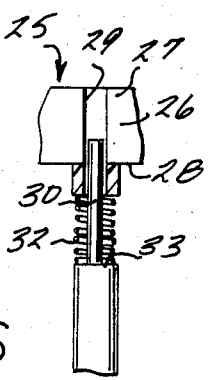
FIG. 6 is a sectional detail view of the alignment feature useful with the invention herein, taken along line 6—6 of FIG. 5.

More specifically, ring 25, according to the illustrations in FIGS. 5 and 6, again, includes a tapered interior surface 26 extending from an edge 27 abutting the underside of the light bulb 17. At the opposite edge ring 25 expands to form an interiorly directed lip 28 provided with a plurality of axially aligned holes 29 each aligned to receive a corresponding post 30 extending from the back interior surface 31 of the rear housing shell 11b. Each of the posts 30, moreover, includes mounted thereon a helical spring 32 interposed between the ring 25 and the shoulder 33 formed on the post. In this manner inward translation against the spring 32 is achieved in the deployment of the ring, thus accommodating lamp thicknesses of various dimensions. Additionally, the sliding translation on the ring against the springs 32 allows for lamp displacement in case of an impact, thereby attenuating shock and damage to the filaments thereof.

Lens 17, as is commonly practiced in the art, includes on the rear surface thereof, the necessary electrical terminals 37 and 38 to which electrical leads 39 and 40 are connected, lead 39 in turn passing through a rocker switch assembly 41 on the back spine of the rear handle casing 12b.

Circuit continuity is then completed by way of yet another lead 42 which, together with lead 40, pass through the bottom end of the handle into a cord 43 of conventional configuration, particularly of the type conformed for insertion into the cigarette lighter outlet of the automobile (not shown).

Figure 4:
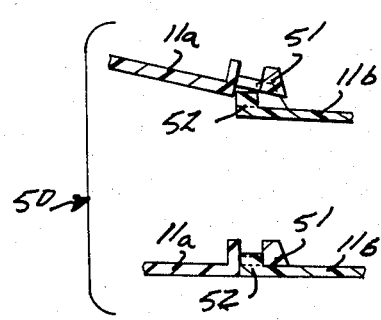
FIG. 4 is a detailed view of the latching mechanism useful with the present invention shown in the course of assembly.

As shown in FIG. 4 the mating and attachment of the two housing halves across the parting line 15 is simply achieved by way of an interlocking engagement 50 comprising a clasping latch 51 formed on the upper surface of the housing half 11a and extending to engage a corresponding projection 52 on the edge of housing half 11b. Thus the upper edge of the two housing halves are engaged to each other by way of this clasping arrangement while the lower half or the handle itself may be fastened by way of two fasteners 52 and 54 extending across handle halves 12a and 12b. In this manner convenience in disassembly is achieved to which a placement of the bulb can be effected and which moreover reduces the cost in assembly.

Figure 3:
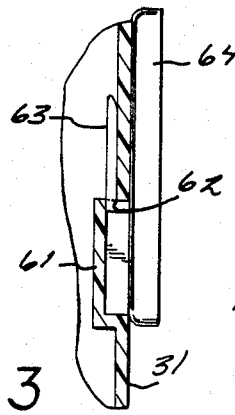
FIG. 3 is a detailed view, in section, illustrating a support feature useful with the invention herein.

Furthermore, as shown in FIG. 3 the back surface of housing half 11b (the interior surface 31) may include an interiorly directed surface offset 61 terminating at the upper edge in an opening 62 through which a hanger bracket 63 on a hanger 64 may be received. This hanger 64 may then be conventionally attached to any surface of the automobile to facilitate transport of the spotlight assembly. Opening 62, moreover, provides the necessary venting of the rear lamp housing 11b, venting the heat produced in the course of the use thereof.

For additional protection a surface convolution in the form of a recess 65 in the surface of housing 11b is formed around switch 41 to provide the necessary structural shielding of switch 41 against inadvertent damage. This surface convolution 65 coincides and extends along the rear spine of the handle half 12b and thus aligns with the thumb placement of the user when grasping the handle.

The foregoing structure may be conveniently made through the process or molding any suitable plastic material which both provides the necessary resiliency to attenuate shock and the convenience and simplicity in manufacture. These features, together with the features providing shielding for the lamp and the switch assembly all cooperate to a result which is both convenient in use and simple in production.

Obviously many modifications and changes may be made to the foregoing description without departing from the spirit of the invention. It is therefore intended that the scope of the invention be determined solely on the claims appended hereto.

What is claimed is:

1. A portable spotlight assembly conformed for electrical excitation from the battery circuit of a motor vehicle comprising:

a housing including a hollow front housing section and a hollow rear housing section conformed to mate to each other, said front and rear housing sections effecting latching engagement proximate one end thereof and fastening means proximate the other end;

a sealed beam lamp received within the common interior of said front and rear housing sections cooperate to define a cylindrical enclosure receiving said lamp and a handle extending radially therefrom, said front and rear housing sections effecting latching engagement on the cylindrical enclosure thereof and fastening means in the handle;

a retaining ring mounted in the rear housing section and aligned to translate along a plurality of guide posts against the rear surface of said lamp including spring means for urging the translation thereof; and a retaining bead in said front housing section for opposing said lamp and said ring.

2. Apparatus according to claim 1 wherein:
said handle includes a switch connected in circuit with said lamp.

3. Apparatus according to claim 2 wherein:
said rear housing section includes a slot formed in the surface thereof for receiving a hanger.

* * * * *

Disclaimer 4,535,397.—*Richard L. May*, Manhattan Beach, Calif. PORTABLE SPOTLIGHT. Patent dated Aug. 13, 1985. Disclaimer filed Mar. 29, 1989, by the assignee, Mr. Gasket Co.

Hereby enters this disclaimer to the entire term of said patent
[ *Official Gazette June* 6, 1989 ]